(12) United States Patent
Noonan

(10) Patent No.: US 6,496,904 B1
(45) Date of Patent: Dec. 17, 2002

(54) METHOD AND APPARATUS FOR EFFICIENT TRACKING OF BUS COHERENCY BY USING A SINGLE COHERENCY TAG BANK

(75) Inventor: Robert L. Noonan, Crystal Lake, IL (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/305,386

(22) Filed: May 5, 1999

(51) Int. Cl.[7] ............................................. G06F 12/00
(52) U.S. Cl. ...................... 711/141; 711/130; 711/146
(58) Field of Search ................................ 711/141, 147, 711/130, 146

(56) References Cited

U.S. PATENT DOCUMENTS 5,796,980 A * 8/1998 Bowles ........................ 711/144
5,828,578 A * 10/1998 Blomgren ..................... 364/488

\* cited by examiner

Primary Examiner—Do Hyun Yoo
Assistant Examiner—Nasser Moazzami
(74) Attorney, Agent, or Firm—Conley, Rose & Tayon, P.C.

(57) ABSTRACT

The present invention provides for a method and an apparatus for encoding coherency tag information for a plurality of busses. A first processor bus is coupled to a host controller. A second processor bus is coupled to a host controller. The host controller is coupled to a single coherency tag bank. Coherency tag data from the first processor bus and the second processor bus is stored into the coherency tag bank. A location of a data set sought by the first processor and the second processor is determined using the coherency tag data.

20 Claims, 6 Drawing Sheets

METHOD AND APPARATUS FOR EFFICIENT TRACKING OF BUS COHERENCY BY USING A SINGLE COHERENCY TAG BANK

BACKGROUND OF THE INVENTION

1. Field of the Invention

This invention relates generally to computer processing, and, more particularly, to computer central processing unit bus architecture.

2. Description of the Related Art

Performance of computers is greatly affected by the efficiency of internal data transfer within a computer system. One primary factor that affects internal data transfer is the performance of data and address busses that are utilized by the various processors within a computer system. As the capabilities of modern processors become more sophisticated, the implementation of bus systems that carry data to and from the processors must also be enhanced. Performance potential of processors in a computer system may not be realized if the bus systems that support the processors are not implemented properly. Many times, bus systems that feed data and addresses to and from the processors in a computer system can actually cause a "bottle neck" effect, slowing down the processing and accessing of data. Delays in accessing data from memory could result in limitations of processor performance. Therefore, efficiency of internal data transfer within computer systems, such as efficiencies in data flow through data busses, is important for optimal performance of computer systems.

Current computer systems that contain multiple processors generally require a plurality of processor busses. Coherency between the multiple data busses within a computer system is important. This is particularly true since processors in most computer system tend to have a relatively large amount of cache memory. Information that is acquired from one data bus may be modified in a cache of a processor and placed on another data bus. Coherency tags are generally used by a host controller to maintain a certain amount of coherency between data busses. To maintain coherency between data busses, generally a number of coherency tag banks are created. Generally, separate tag banks are created for each processor bus within a computer system. The information relating to each processor bus is logged into each coherency tag bank. When an access to a coherency tag bank is required, the host controller checks each coherency tag bank to locate a particular tag that relates to the processor bus.

Accessing and updating coherency information must be done at the highest possible speed. Quite often, there may be more than one coherency tag lookup that is executed per clock cycle. If the coherency tag architecture that is implemented does not have the bandwidth to keep up with the rapid transfer of data, overall performance of the computer system can be compromised. Furthermore, interfaces are generally needed for each new tag bank, which is typically a set of static random access memory (SRAM), requiring more logic and integrated circuit (IC) chip pins, thereby increasing the cost of the associated controller.

Often, a data bus may be more active than another data bus. The imbalance of bus activity could result in a non-symmetrical utilization of coherency tag banks. The non-symmetrical utilization of coherency tag banks could result in unnecessary evictions of tag locations from the coherency tag banks. Unnecessary evictions of tag locations can cause the overall performance of the computer system to be compromised.

The current implementation of coherency tags for multiple processor busses includes a separate bank of coherency tags for each data bus. When a data transfer cycle is implemented on any bus, a coherency tag bank lookup is performed in all coherency tag banks. The same is true when entering updates to the coherency tag information. Since the coherency tag information is generally stored in separate banks with separate corresponding interfaces, access to the coherency tag information is generally performed in parallel.

There are numerous disadvantages associated with the current implementation of coherency tags. One problem with the current implementation of coherency tags is a high cost in bandwidth due to multiple accesses to several coherency tag banks. Each lookup of coherency tag information requires a separate read cycle to each bank. Updates to the coherency tag information generally require a separate write cycle to each coherency tag bank. Even if the separate read and write (update cycles) cycles were performed in parallel to reduce bandwidth costs, an increased number of signal pins on the hardware will be required.

Another problem with the current implementation of coherency tags is a redundancy of coherency tag lines. Often, the coherency state information for the same address will be held in multiple coherency tag banks. The redundancy of the coherency state information results in unused coherency tag line resources.

Furthermore, non-symmetric bus activity can cause imbalanced coherency tag utilization. The coherency tag bank supporting the more active data bus will have much higher utilization, causing more unnecessary evictions than there would have been in a balanced system. Excessive unnecessary eviction of coherency tag information can lead to lower cache hit rates.

Another problem associated with the current implementation of coherency tags is the relatively high cost of expanding to add more data busses. Generally, adding a third processor data bus to a two processor data bus system would require approximately an additional fifty hardware signal pins and associated logic. The additional pins and associated logic will be required to control additional coherency tag banks. This additional cost of more pins and logic would increase the cost of adding an additional processor to a computer system.

The present invention is directed to overcoming, or at least reducing the effects of, one or more of the problems set forth above.

SUMMARY OF THE INVENTION

In one aspect of the present invention, a method is provided for encoding coherency tag information for a plurality of busses. A first processor bus is coupled to a host controller. A second processor bus is coupled to a host controller. The host controller is coupled to a single coherency tag bank. Coherency tag data from the first processor bus and the second processor bus is stored into the coherency tag bank. A location of a data set sought by the first processor and the second processor is determined using the coherency tag data.

In another aspect of the present invention, an apparatus is provided for encoding coherency tag information for a plurality of busses. The apparatus of the present comprises of: at least one left-side processor bus; at least one right-side processor bus; a host controller electrically coupled with the left-side processor bus and the right-side processor bus; and a single coherency tag bank electrically coupled with the host controller.

BRIEF DESCRIPTION OF THE DRAWINGS

The invention may be understood by reference to the following description taken in conjunction with the accompanying drawings, in which like reference numerals identify like elements, and in which.

Figure 1:
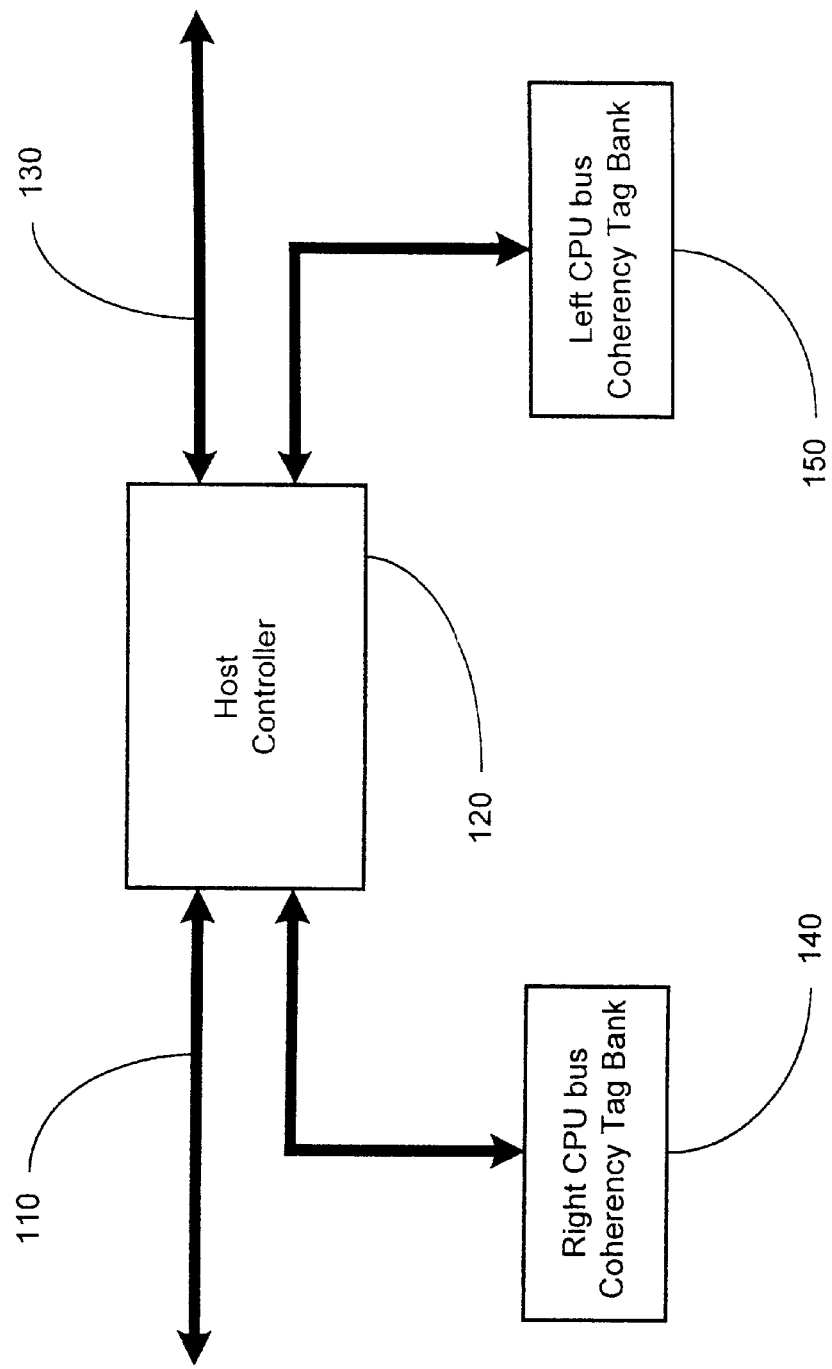
FIG. 1 is an illustration of one implementation of a multiple coherency tag bank system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to FIG. 1, one implementation of a multiple coherency tag bank system is illustrated. A left CPU bus 110 couples at least one left CPU (not shown) to a host controller 120. A right CPU bus 130 couples at least one right CPU (not shown) to the host controller 120. The host controller 120 is electrically coupled to the left CPU bus coherency tag bank 140 and the right CPU bus coherency tag bank 150. An example of the implementation of coherency tag banks shown in FIG. 1 follows. For example, assume that the left CPU bus 110 and the right CPU bus 120 are coupled to four processors with four Megabytes 4-way cache system, and a 64-byte line size. For each coherency tag bank, a requirement of one Megabyte coherency tags to hold coherency tag information for each coherency tag bank is needed for full inclusion.

The one Megabyte cache line requirement was calculated by multiplying the four Megabyte cache by four (representing the 4-way cache), and multiplying the resulting product by four (representing four processors). This resulted in 64 Megabyte cacheable memory. The 64 Megabyte cacheable memory is then divided by the number of bytes per line (which in this example is a 64 byte line size), which results in one Megabyte cache line to hold coherency tag information in each coherency tag bank. This results in a 36 bit P6© address which is broken up as follows: 6 bits for cache line offset, 20 bits for tag index (for one Megabyte lines), and 10 bits for tag address. Therefore, the tag information can be stored in 16 bits as follows: 10 bits for tag address, two bits for coherency state, and four bits for application specific use.

Figure 2:
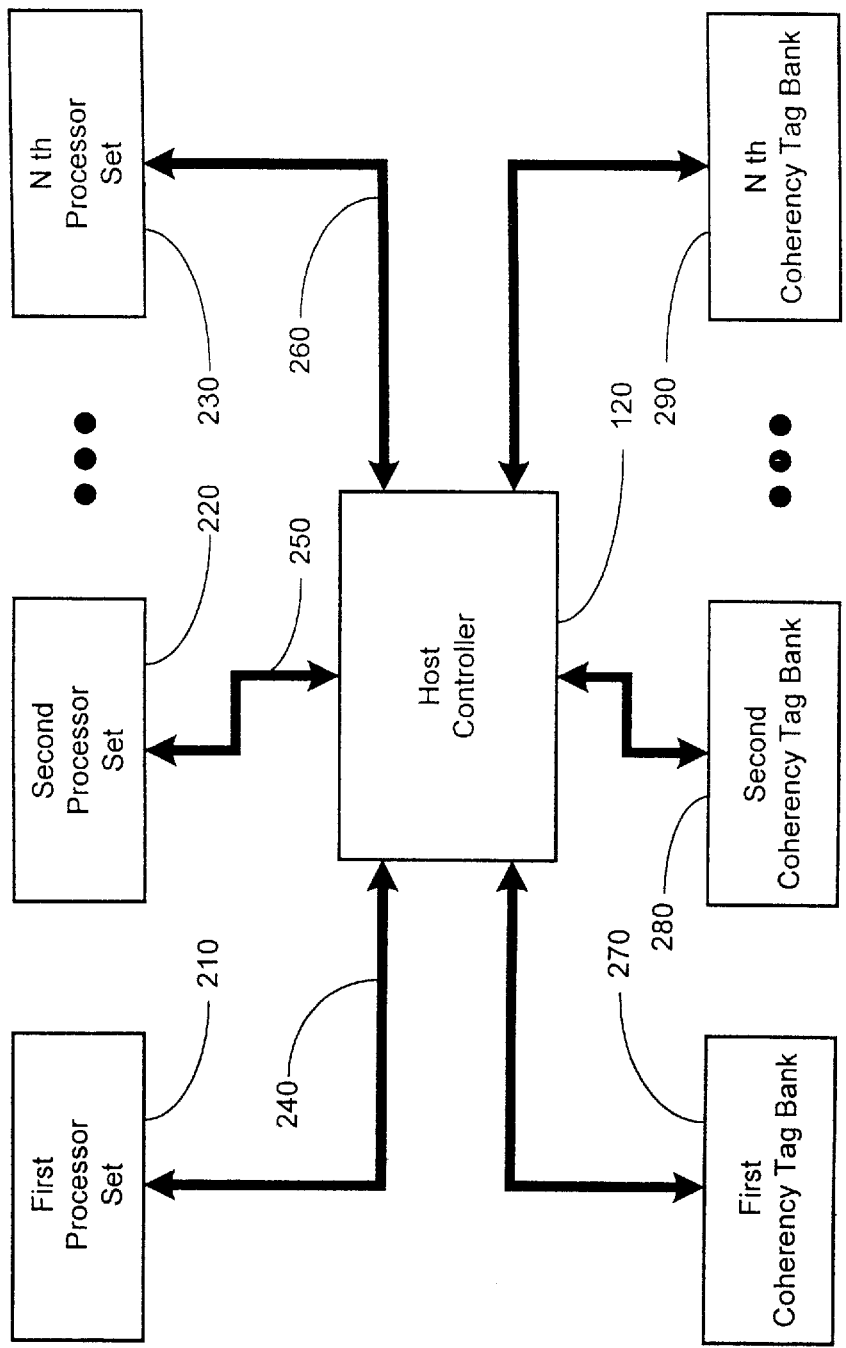
FIG. 2 depicts a more detailed embodiment of an implementation of a multiple coherency tag bank system.

In an alternative embodiment, multiple processors may be electrically coupled to the host controller 120. Turning now to FIG. 2, a first processor set 210 and a second processor set through Nth processor set 220, 230 are electrically coupled to the host controller 120 through a first processor through an Nth processor bus 240, 250, 260. Each processor set 210, 220, 230 may contain one or more processors. The host controller 120 maintains coherency between the first though Nth processor busses 240, 250, 260 by accessing the first coherency tag bank 270 and a second coherency through Nth tag bank 280, 290. Multiple data access clock cycles are required to access the coherency tag information to maintain coherency between the first through Nth processor busses 240, 250, 260.

Figure 3:
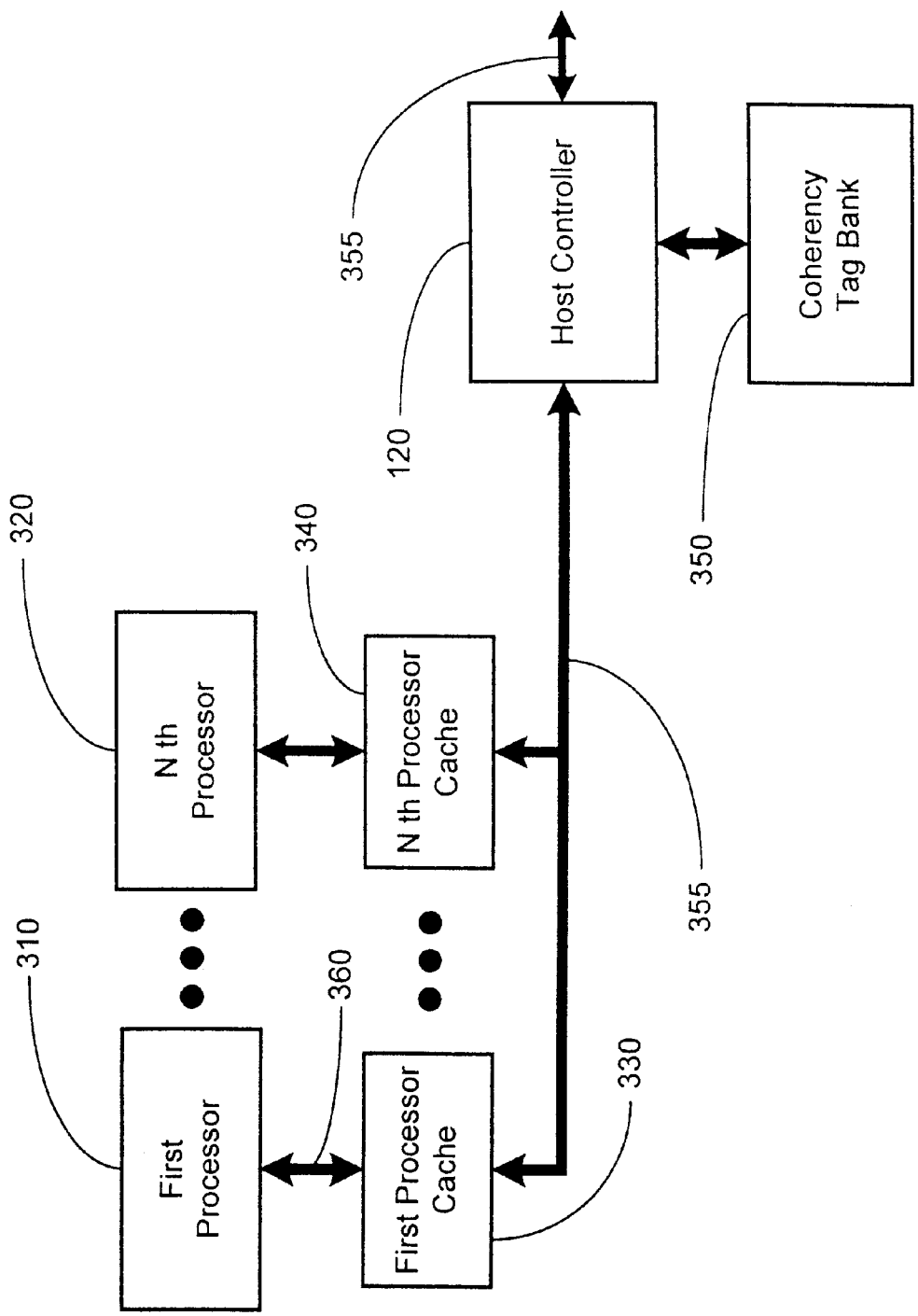
FIG. 3 depicts a detailed depiction of a coherency tag bank system.

Turning now to FIG. 3, one embodiment of a coherency tag bank system is illustrated. A first through Nth processor 310, 320 is electrically coupled to a first through Nth processor cache 330, 340, respectively. The first processor 310 stores and retrieves program code and data to and from the first processor cache 330. When the first processor 310 attempts to retrieve data that is not stored in the first processor cache 339, generally, a processor bus cycle occurs. In one embodiment, the coherency information that corresponds to the data sought by the first processor 310 is stored in the coherency tag bank 350. The coherency information will generally indicate whether the data sought by the first processor 310 is residing on RLN another processor bus or whether the data is stored in memory (not shown). The host controller 120, which is coupled with the coherency tag bank 350, is used to access information from the coherency tag bank 350. The host controller 120 is capable of receiving multiple data busses 355. The information retrieved from the coherency tag bank 350 is used to determine whether a set of data sought by the first processor 310 is available on a first processor data bus 360 coupled to the first processor cache 330. The tag bank operation of the Nth processor 320 is performed in a similar manner.

Figure 4:
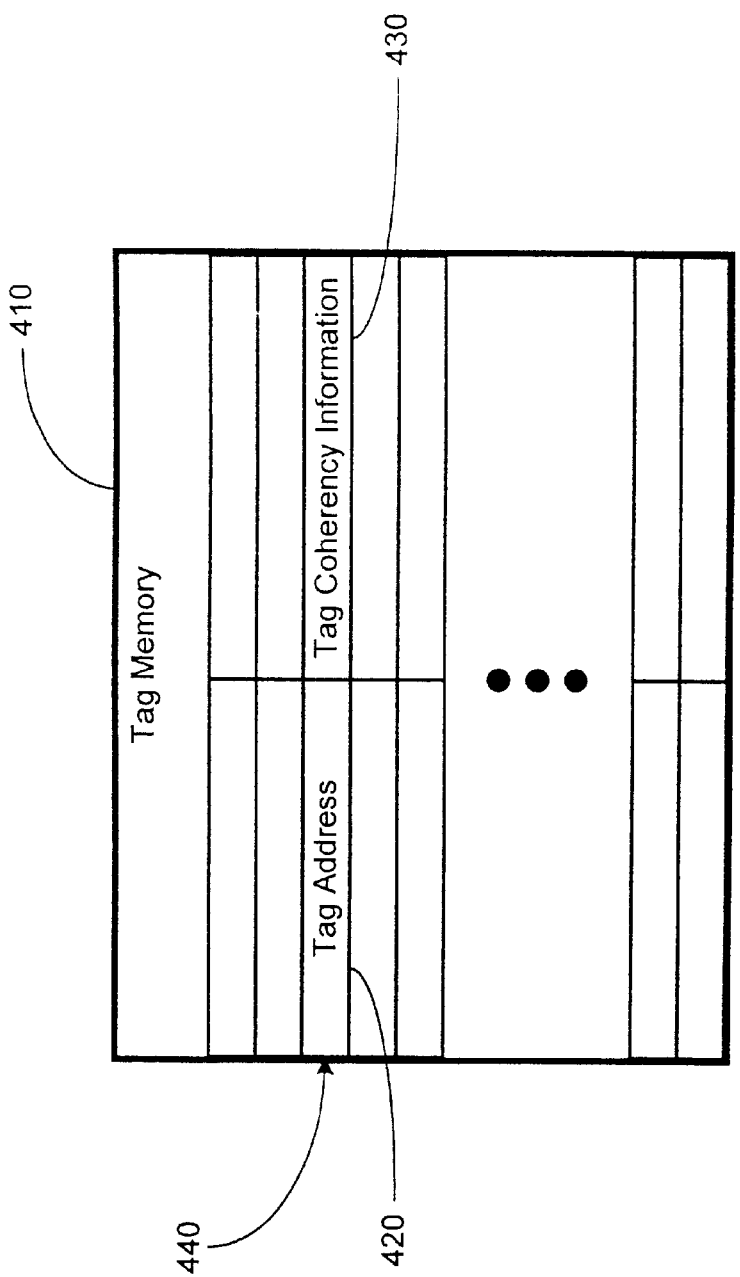
FIG. 4 illustrates some of the contents of a coherency tag bank.

As illustrated in FIG. 4, in one embodiment, a tag memory 410 comprises a tag address 420 section and a tag coherency information 430 section. In one embodiment, among the information retrieved from the tag memory 410 includes the tag address 420 and the coherency tag information 430. In one embodiment, the tag bank will point to a particular location 440 in the tag memory 410, which contains the tag address 420 and the tag coherency information 430 for a particular processor bus.

Although the following section is described in relation to the first processor 310, the description is valid for each of the first through Nth processors 310, 320. The tag address 420 retrieved from the tag memory 410 is compared to the address field that resides in the location in a cache memory (not shown). When the tag address 430 retrieved from the tag memory 410 is found to be the same as the information found in the address field in the cache memory, a determination that a successful hit has occurred, is made. A successful hit indicates that the coherency information that corresponds to the data being sought by the first processor 310, and which is not located in the first processor cache 330, is available in the coherency tag bank 350. In one embodiment, the coherency information will provide indications regarding the location of the data being sought by the first processor 310. When the tag address 420 retrieved from the tag memory 410 is found to be the different compared to the information found in the address field in the cache memory, a determination that an unsuccessful hit has occurred, is made.

Upon the occurrence of an unsuccessful hit, a determination is made that the data being sought can be found in memory. Generally, an unsuccessful hit indicates that the data being sought by the first processor 310, and which is not located in the first processor cache 330, is invalid in all other processor caches and other processor busses. Once the determination that the address field in the cache memory now points to a different location in the processor cache is made, an eviction of the line pointed by the tag bank is executed. As part of the eviction process, the tag address 420, which now points to a different location in the processor cache, is now pushed into the location in the cache memory that is pointed by the tag bank. Therefore, the next time the first processor 310 inquires of a particular data that could be stored in the first processor cache 330, the tag bank may be able to point to a particular location in the cache memory that may contain information in an address field. The information found in the address field in the cache memory pointed by the tag bank, may lead to a particular location in the cache memory which contains the address field that leads to the data sought by the first processor 310.

Figure 5:
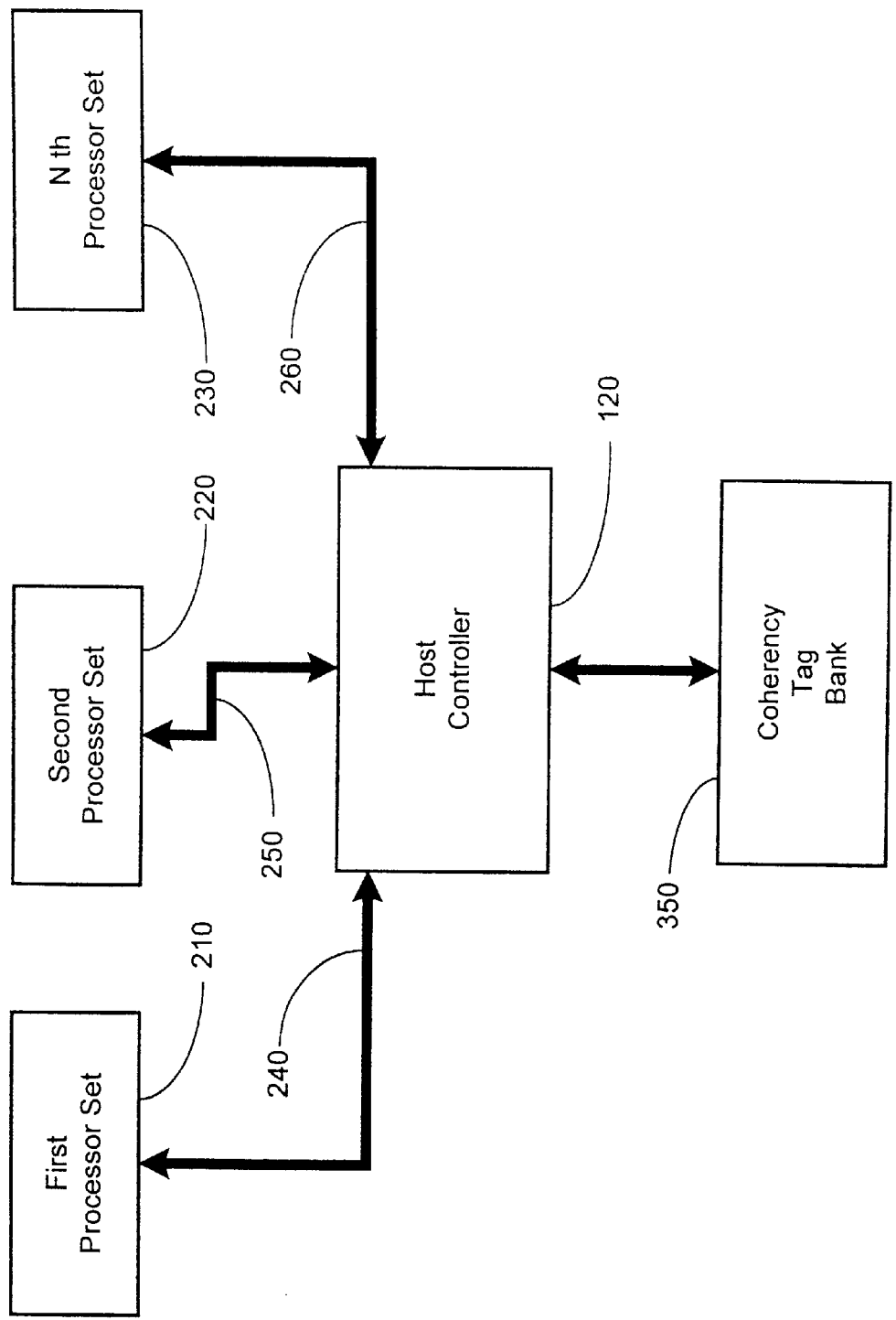
FIG. 5 illustrates one embodiment of an implementation of a single coherency tag bank.

Turning now to FIG. 5, one embodiment of an implementation of a single coherency tag bank system, is illustrated. As shown in FIG. 5, one coherency tag bank 350 is used to service the coherency tag requirements of a plurality of processors. A first processor set 210 and a second through Nth processor set 220, 230 are electrically coupled to a host controller 120. The host controller 120 is coupled to the coherency tag bank 350. In one embodiment, the coherency tag bank 350 stores tag addresses, encoded data, and other information regarding a particular tag's state on all processor busses. Therefore, only one interface (the host controller 120) is needed to acquire tag information related to any processor bus. The design and implementation of a single tag bank system is generally more efficient than the design and implementation of a multiple tag bank system.

Figure 6:
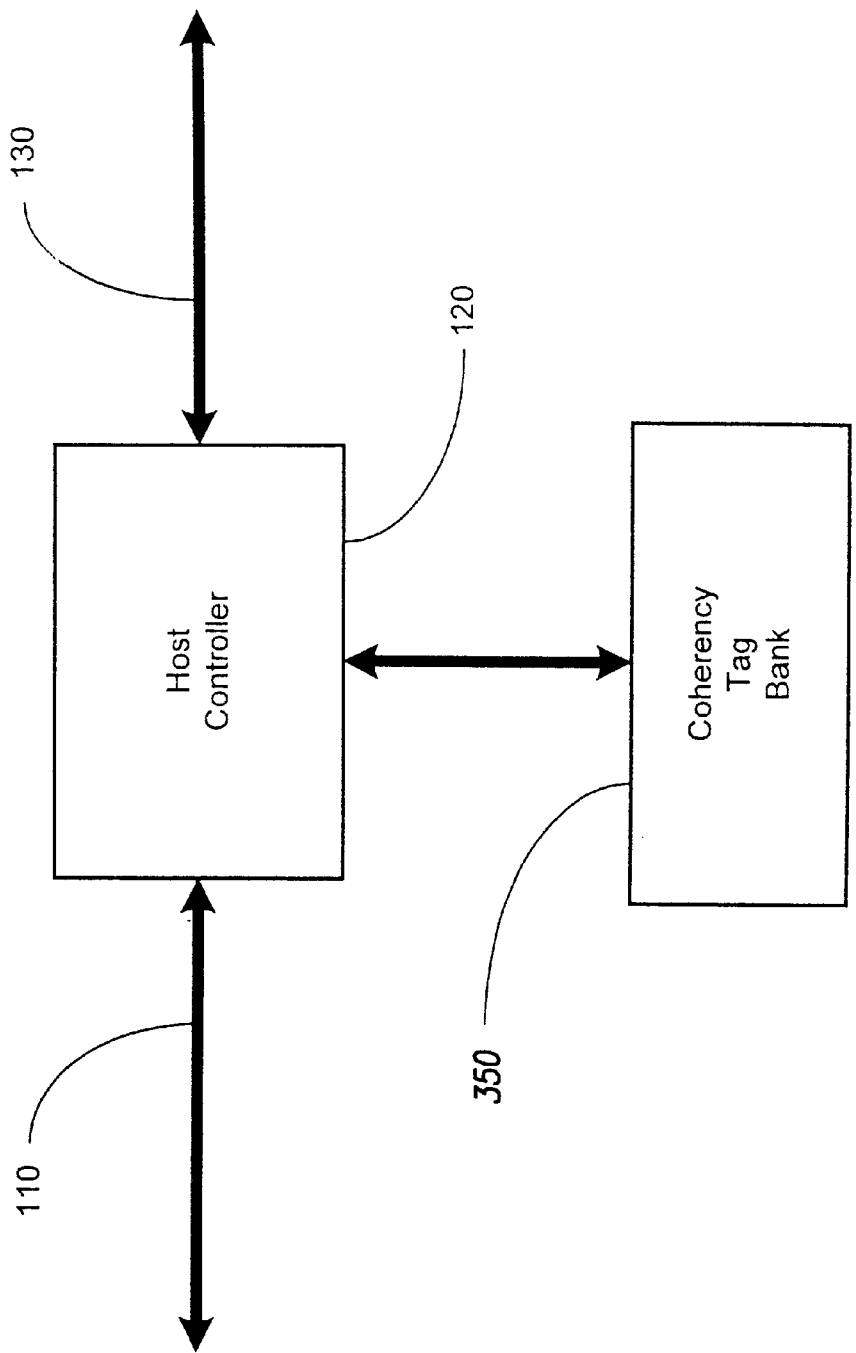
FIG. 6 illustrates an alternative embodiment of a single coherency tag bank system.

Another example of an embodiment of a single tag bank system is illustrated in FIG. 6. The left CPU bus 110 couples at least one left CPU (not shown) to a host controller 120. A right CPU bus 130 couples at least one right CPU (not shown). The host controller 120 is electrically coupled to the coherency tag bank 350. An example of the implementation of a single coherency tag bank system shown in FIG. 6 follows. As an example, assume that the left CPU bus 110 and the right CPU bus 130 are coupled to four processors with four Megabytes 4-way cache system, and a 64-byte line size. The system illustrated in FIG. 6 has two busses, the left CPU bus 110 and the right CPU bus 130. In one embodiment, the coherency tag bank 350 comprises two Megabyte cache lines to hold coherency tag.

The two Megabyte cache line requirement was calculated by multiplying the four Megabyte cache by four (representing the 4-way cache), multiplying the resulting product by four (representing four processors), and finally multiplying the resulting product by two (representing the two busses in the system). This resulted in 128 Megabyte cacheable memory. The 128 Megabyte cacheable memory is then divided by the number of bytes per line (which in this example is a 64 byte line size), which results in two Megabyte cache line to hold coherency tag information in each coherency tag bank. This results in a 36 bit P6© address which is broken up as follows: 6 bits for cache line offset, 21 bits for tag index (two Megabyte cache lines), and 9 bits for tag address. Therefore, the tag information can be stored in 16 bits as follows: 9 bits for tag address, two bits for coherency state for a first bus, two bits of coherency state for a second bus, and at least three bit for application specific use.

The single tag bank embodiment described by FIG. 5 and FIG. 6 only require a single read in order to acquire coherency tag information for substantially all processor busses. Generally, in the single tag bank embodiment, coherency tag information updates are performed in a single write sequence. Single write sequences are sufficient for updating coherency tag information in the single tag bank embodiment, regardless of a plurality of processor or CPU busses in the computer system (not shown). Among the advantages that can be realized by employing the single write sequences used for updating coherency tag information includes increased bandwidth within the computer system's internal communication system (not shown). Another such advantage includes the need for fewer logic gates and hardware signal pins that are used for coherency tags.

One characteristic of the single tag bank embodiment includes the elimination of redundant tag lines that are generally a characteristic of multiple coherency tag bank systems. Since each coherency tag contains information for substantially all processor or CPU busses within the computer system, generally, there will be virtually no duplicate coherency tag addresses. The lack of duplicate coherency tag addresses facilitates a greater number of usable tag locations for the same amount of memory. In other words, in a multiple tag bank system, if one processor bus contains a cache line that is now required to be copied into another processor bus, both tag banks will contain the same cache line. Effectively, a single tag address or tag location is utilizing resources in two separate coherency tag banks, requiring double the memory space required to store the coherency tag information. Whereas in a single tag bank embodiment, memory space is utilized more efficiently because duplicate coherency tag lines are generally not possible since there is only one coherency tag bank 350.

In non-symmetric bus systems, where one processor bus is more active than another, a considerable number of unnecessary evictions may occur. In multiple coherency tag bank systems, a tag bank associated with a processor or CPU bus that is more active than the rest of the busses will encounter a disproportionately higher number of evictions of coherency tag information from its memory. In a single coherency tag bank system, non-symmetric bus activity produces virtually no negative effect. In a single coherency tag bank system, all processor and CPU busses utilize the same coherency tag bank, therefore, the eviction problems associated with the multiple coherency tag bank systems is substantially reduced. Reduction of unnecessary evictions of coherency tag information from the coherency tag bank 350 increases the possibility that the coherency tag information sought by the processor, at any given moment in time, will be located in the coherency tag bank 350. A higher possibility of locating a desired coherency tag line increases the hit-rate of coherency tag usage in a computer system.

Furthermore, single coherency tag bank systems are relatively inexpensive to expand. If a two processor bus system were to be expanded to a four processor bus system, the coherency tag information would generally still fit into the same memory used for the two processor systems. In a four-processor bus system, the single coherency tag bank system provides twice the coherency tag access bandwidth over the multiple processor system. Furthermore, in a four-processor bus system, the single coherency tag bank system requires half the logic gates and hardware signal pins than those required by a multiple coherency tag bank system. The greater the number of processor busses used in the computer system, the more efficient the single coherency tag system becomes over the multiple coherency tag system.

In an alternative embodiment of the single coherency tag bank system, the coherency tag bank 340 can be subdivided into multiple interconnected coherency tag banks 350. Despite subdividing the coherency tag bank 350 into subdivisions, it is still logically a single tag bank. Multiple accesses into subdivisions of the interconnected coherency tag banks 350 can be made in a parallel format. Multiple parallel access into the sub-divisions of the interconnected coherency tag bank 350 can improve the speed of the coherency tag system. Subdividing coherency tag banks 350 can double the coherency tag access bandwidth while utilizing the same number of hardware logic pins.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for encoding coherency tag information for a plurality of processor busses, each processor bus having one or more processors connected thereto, comprising:

coupling a first processor bus to a host controller;

coupling a second processor bus to the host controller;

coupling said host controller to a single coherency tag bank;

storing coherency tag data from said first processor bus and said second processor bus into said single coherency tag bank; and determining a location of a data set sought by said first processor bus and said second processor bus using said coherecy tag data.

2. The method as described in claim 1, wherein coupling a first processor bus to the host controller and coupling a second processor bus to the host controller further comprise providing access for said first processor bus and said second processor bus to data in said coherency tag bank.

3. The method as described in claim 1, wherein coupling said host controller to a single coherency tag bank further comprises said host controller performing the function of an interface circuit for said coherency tag bank.

4. The method as described in claim 1, wherein coupling said host controller to a single coherency tag bank further comprises interconnecting a plurality of sub-divisions into said single coherency tag bank.

5. The method as described in claim 1, wherein storing coherency tag information from said first processor bus and said second processor bus into said single coherency tag bank further comprises storing coherency tag address and encoded data for said first processor bus and said second processor bus.

6. The method as described in claim 5, wherein storing coherency tag address and encoded data for said first processor bus and said second processor bus further comprises storing a 36-bit address.

7. The method as described in claim 6, wherein storing said 36 bit address further comprises storing a 36 bit address that comprises six bits of cache line offset data, twenty-one bits of tag index data, and nine bits of tag address data.

8. The method as described in claim 1, wherein determining a location of a data set sought by said first processor bus and said second processor bus using said coherency tag data further comprises determining said data set is located on a processor bus.

9. The method as described in claim 1, wherein determining a location of a data set sought by said first processor bus and said second processor bus using said coherency tag data further comprises determining said data set is located in a memory.

10. An apparatus for encoding coherency tag information for a plurality of busses, comprising:

at least one left-side processor bus configured to be coupled to a plurality of processors;

at least one right-side processor bus configured to be coupled to a plurality of processors;

a host controller electrically coupled with said left-side processor bus and said right-side processor bus; and a single coherency tag bank electrically coupled with said host controller.

11. The apparatus described in claim 10, wherein said left-side processor bus is a central processing unit bus.

12. The apparatus described in claim 10, wherein said right-side processor bus is a central processing unit bus.

13. The apparatus described in claim 10, wherein said host controller further comprises an interface circuit that is capable of providing access for said left-side processor bus to said single coherency tag bank.

14. The apparatus described in claim 13, wherein said host controller further comprises an interface circuit that is capable of providing access for said right-side processor bus to said single coherency tag bank.

15. The apparatus described in claim 14, wherein said single coherency tag bank is capable of storing coherency tag a duress and encoded data for said first processor bus and said second processor bus.

16. The apparatus described in claim 15, wherein said coherency tag bank is capable of storing at least one 36-bit address.

17. The apparatus described in claim 16, wherein said 36 bit address stored in said coherency tag bank further comprises:

six bits of cache line offset data;

twenty-one bits of tag index data; and nine bits of tag address data.

18. The apparatus described in claim 14, wherein said single coherency tag bank is subdivided into a plurality of subdivisions that are accessible by said first processor bus and said second processor bus.

19. The apparatus described in claim 18, wherein said plurality of subdivisions of said subdivided coherency tag bank are interconnected.

20. An apparatus for encoding coherency tag information for a plurality of busses, comprising:

means for coupling a first processor bus to a host controller;

means for coupling a second processor bus to the host controller;

means for coupling said host controller to a single coherency tag bank;

means for storing coherency tag data from said first processor bus and said second processor bus into said single coherency tag bank; and means for determining a location of a data set sought by said first processor and said second processor using said coherency tag data.

* * * * *